Nov. 5, 1963
S. J. FRITZ
3,109,615
BALLISTIC ACTUATED DEVICE FOR REELING
IN AN ELONGATED FLEXIBLE ELEMENT
Filed April 19, 1962
2 Sheets-Sheet 1
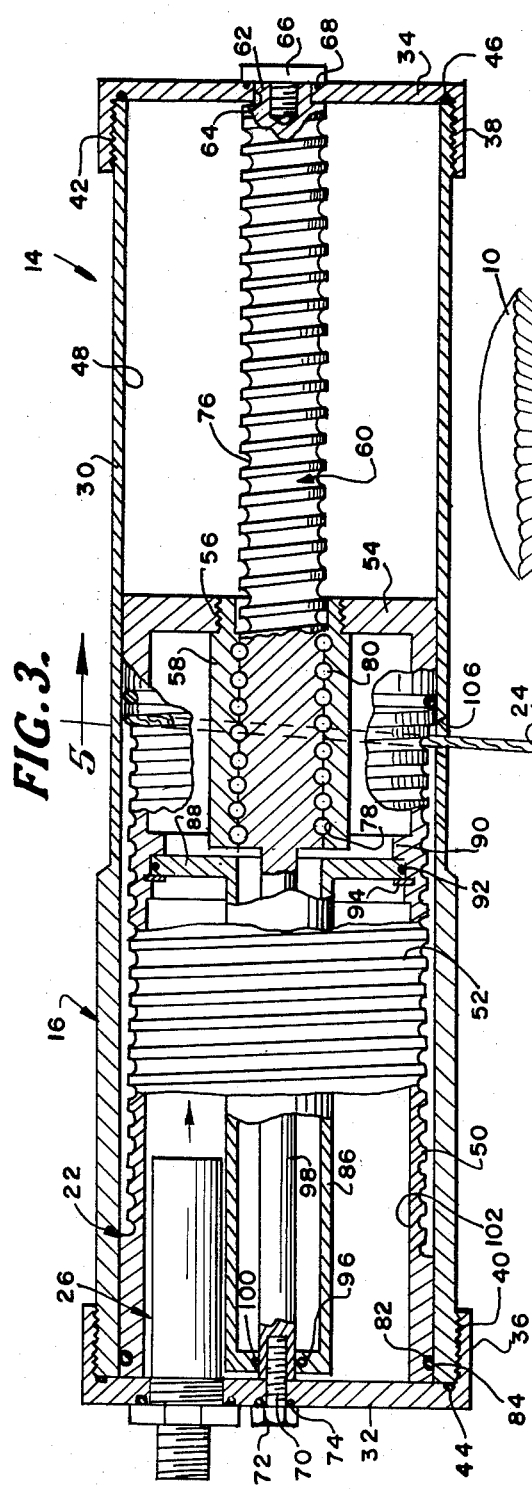
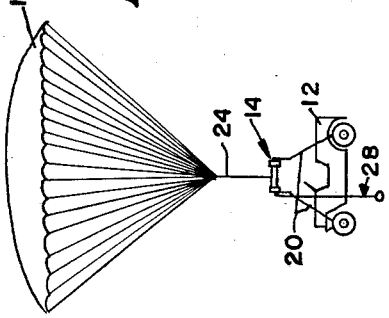
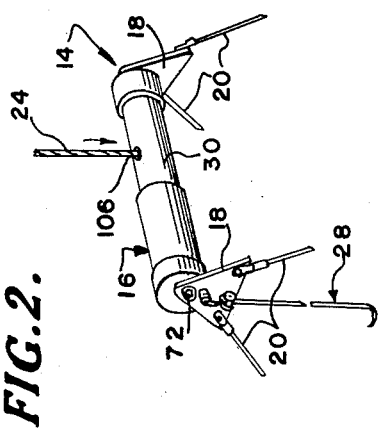
INVENTOR.
Stewart J. Fritz
BY
Cushman, Darby & Cushman
ATTORNEYS Nov. 5, 1963
S. J. FRITZ
3,109,615
BALLISTIC ACTUATED DEVICE FOR REELING
IN AN ELONGATED FLEXIBLE ELEMENT
Filed April 19, 1962
2 Sheets-Sheet 2
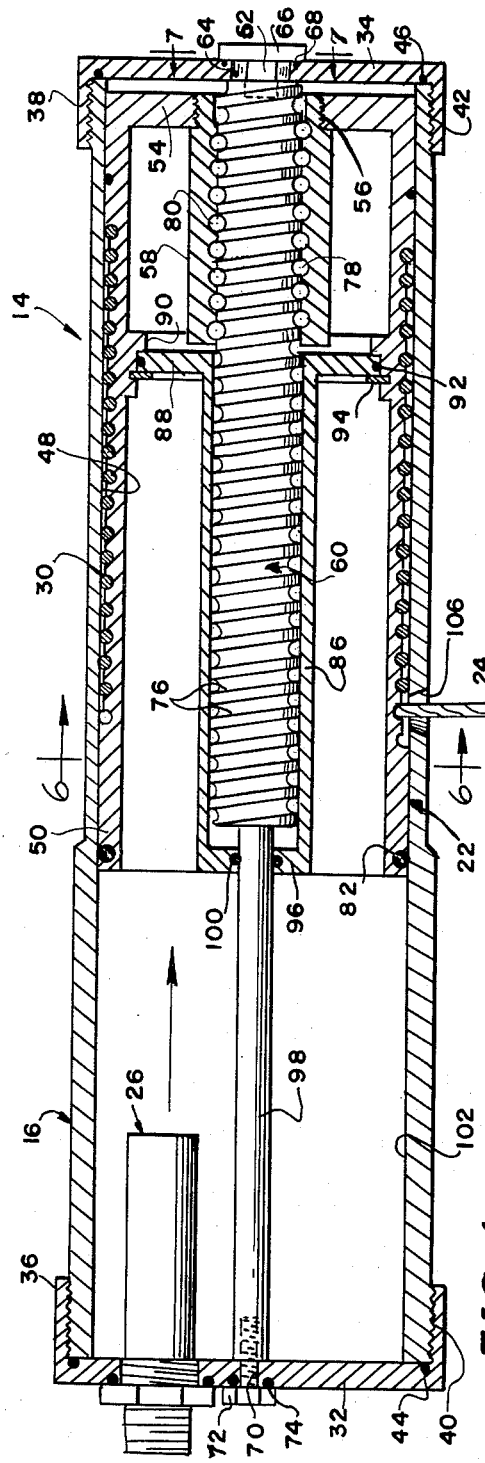
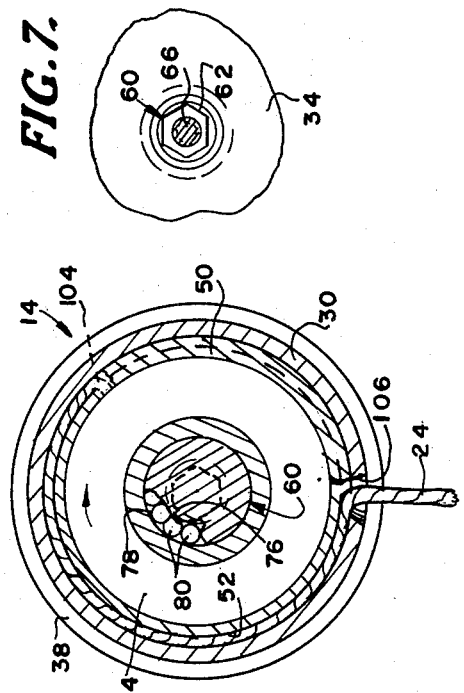
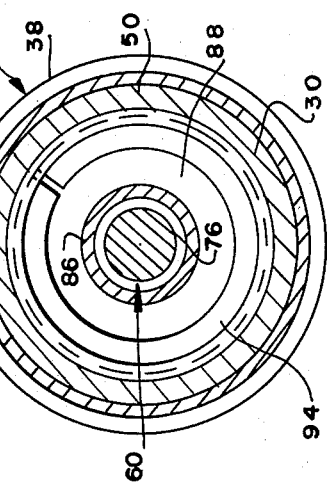
INVENTOR.
Stewart J. Fritz
BY
Cushman, Darby & Cushman
ATTORNEYS

United States Patent Office 3,109,615
Patented Nov. 5, 1963

3,109,615
BALLISTIC ACTUATED DEVICE FOR REELING IN AN ELONGATED FLEXIBLE ELEMENT
Stewart J. Fritz, Scottsdale, Ariz., assignor to Rocket Power, Inc., Mesa, Ariz., a corporation of Arizona
Filed Apr. 19, 1962, Ser. No. 188,619
10 Claims. (Cl. 244—138)

This invention relates to ballistic actuated reels and more particularly to a ballistic actuated device for reeling in an elongated flexible element.

While the present device would have applicability in any environment where it is desired to reel in an elongated flexible element in response to the ignition of a ballistic charge, the device is particularly adapted for use in cargo parachutes for reducing the landing speed of the cargo upon landing in the manner similar to that disclosed in Smith Patent 2,477,907 issued August 2, 1947. As disclosed in the Smith patent, the landing speed of the cargo can be substantially reduced by providing a reel device in the lines connecting the cargo to the parachute. In accordance with the Smith disclosure, means are provided for sensing when the cargo has reached a position near the ground. When this sensing means determines that the cargo is nearing the ground, it serves to actuate a ballistic charge. The actuation of the charge affects rotation of the reel and the rotation of the reel will impart an upward relative vertical movement to the cargo thus reducing the downward vertical component of movement of the cargo when it reaches the ground to a more tolerable value. An ideal situation would be one in which the vertical component upon contact with the ground would be substantially zero.

An object of the present invention is to provide a ballistic actuated device for reeling in an elongated flexible element which is capable of optimum simplicity and efficiency of operation in a parachute-cargo combination such as disclosed in Smith Patent 2,477,907.

Another object of the present invention is the provision of a ballistic actuated device for reeling in an elongated flexible element in which the position at which the flexible element is reeled in with respect to the frame or housing of the device is fixed so as to insure that there will be no change in the distribution of the cargo load before and after the ballistic actuation.

Another object of the present invention is the provision of a ballistic actuated device for reeling in an elongated flexible element having improved means for mounting a reel within a substantially closed housing for both rotary and longitudinal movement in response to the ignition of a ballistic charge.

Still another object of the present invention is the provision of a ballistic actuated device for reeling in an elongated flexible element which includes a minimum number of parts contained within an envelope of minimum size, which parts are efficient and effective in operation and economical to produce.

These and other objects of the present invention will become more apparent during the course of the following detailed description and appended claims.

The invention may best be understood with reference to the accompanying drawings wherein an illustrative embodiment is shown.

In the drawings:

FIGURE 1 is an elevational view of a ballistic actuated reel device embodying the principles of the present invention showing the same in operative position with respect to a cargo parachute;

FIGURE 2 is a perspective view of the ballistic actuated reel device shown in FIGURE 1;

FIGURE 3 is a longitudinal sectional view of the device showing the parts in the position they assume prior to ignition of the ballistic charge;

FIGURE 4 is a view similar to FIGURE 3 showing the parts in the position they assume after ignition of the ballistic charge;

FIGURE 5 is a sectional view taken along the lines 5—5 of FIGURE 3;

FIGURE 6 is a sectional view taken along the lines 6—6 of FIGURE 4; and

FIGURE 7 is a fragmentary sectional view taken along the lines 7—7 of FIGURE 4.

Referring now more particularly to the drawings, there is shown in FIGURE 1 a cargo parachute, generally indicated at 10, of the type disclosed in the above-mentioned Smith patent. The parachute 10 is adapted to support cargo of any desired type and, as shown, a land vehicle, indicated at 12, is supported by the parachute 10. Connected between the parachute 10 and the cargo 12 is a ballistic actuated reel device, generally indicated at 14, which embodies the principles of the present invention.

As best shown in FIGURES 2 and 3, the device 14 includes a housing, generally indicated at 16, which may be either connected to the parachute 10 or the cargo 12. As shown, the housing 16 is connected with the cargo 12 by any suitable means, such as end plates 18 fixed to the ends of the housing and a plurality of lines 20 having the ends thereof secured to the plates 18 and to the cargo 12 respectively.

Mounted within the housing 16 for both rotational and longitudinal movement with respect thereto is a reel, generally indicated at 22. The reel may be connected either with the cargo 12 or with the parachute 10 and, as shown, it is connected with the parachute 10 by any means, such as a cable or line 24 having one end suitably fixed to the reel and the opposite end thereof fixed to the lines of the parachute.

The reel device 14 also includes a ballistic charge 26 mounted within the housing. The charge is electrically ignited by a charge ignitor unit, generally indicated at 28, which unit may be similar to that disclosed in the Smith patent for effecting ignition of the ballistic charge in response to the movement of the cargo into a position adjacent the ground.

The present invention is more particularly concerned with the construction and operation of the ballistic actuated reel device 14. It will be understood that while the device is particularly suited for use in a parachute-cargo combination of the type described above and shown in the Smith patent, the device may be readily adapted for use in other combinations. For example, the present ballistic actuated device could be utilized to reel in an elongated flexible element for purposes of effecting man seat separation in a conventional catapault type pilot escape system. The present reel structure could be adapted for use as a ballistic actuated harness inertia reel.

Referring now more particularly to FIGURES 3-7, the housing 16 of the device 14 preferably includes an elongated tubular housing member 30 having a pair of end closures or housing members 32 and 34 detachably fixedly secured to opposite ends thereof. As shown, the end closures 32 and 34 include interiorly threaded annular skirt portions 36 and 38 respectively which are arranged to cooperate with exterior thread sections 40 and 42 formed on the exterior peripheral ends of the tubular housing member 30 respectively. Preferably, the end closures 32 and 34 are sealed in fluid tight engagement with the tubular housing member 30 by any suitable means such as O-ring seals 44 and 46 respectively. It will be noted that the tubular housing member 30 provides an elongated peripheral wall which extends between the end closures and defines with the end closures an interior cylindrical chamber 48 within which the reel 22 is mounted for rotational and longitudinal movement.

The reel 22 comprises a hollow cylindrical reel member 50 having its exterior peripheral surface arranged to receive a flexible elongated element, such as the cable 24 previously described. To this end, the exterior periphery of the reel member 50 has a helical groove 52 formed therein throughout the central portion thereof.

In order to mount the reel member 50 within the housing 16 for rotary as well as longitudinal movement, the end of the reel member 50 adjacent the end closure 34 is formed with a radially inwardly extending flange 54. Fixedly secured to the flange 54, as by a threaded connection 56 or the like, is a nut member 58 which preferably is of hollow cylindrical configuration and extends within the reel member 50 in concentric relation thereto.

Extending through the nut member 58 is an elongated rigid structure, generally indicated at 60. As best shown in FIGURE 7, the end of the elongated rigid structure adjacent the end closure 34 is formed with an exterior peripheral non-circular spline connection which, as shown, is hexagonal as indicated at 62. The hexagonal end 62 of the elongated rigid structure is adapted to engage within a correspondingly shaped aperture 64 formed in the central portion of the end closure 34 and is retained in engagement therewith by any suitable means, such as a bolt 66 threadedly engaged within the end of the elongated rigid structure and having its head engaging the outer surface of the end closure 34. The connection between the end closure 34 and the elongated rigid structure is preferably made fluid tight by any suitable means, such as an O-ring seal 68 formed in the outer surface of the end closure member 34 in a position to engage the cooperating surface of the bolt 66.

The opposite end of the elongated rigid structure 60 adjacent the end closure 32 is preferably secured to the latter in order to strengthen the entire structure. As shown, the end of the elongated rigid structure abuts the central portion of the end closure 32 and the latter is provided with a centrally located aperture 70 through which a bolt 72 extends for threaded engagement within the adjacent end of the elongated rigid structure. As before, the connection may be made fluid tight by the provision of an O-ring seal 74.

The elongated rigid structure 60 includes a first exterior peripheral portion which is provided with inter-engaging means cooperating with the interior peripheral portion of the nut member 58 for controlling the rotary and longitudinal movement of the reel 22 in response to the ignition of the ballistic charge 26. The interengaging means may take various forms, however, as shown, the elongated rigid structure 60 includes a portion extending from the end closure 34 having a helical groove 76 formed on the exterior periphery thereof. A similar helical groove 78 is formed on the interior periphery of the nut member 58 and a plurality of balls 80, of a hard material such as metal or the like are mounted within the grooves 76 and 78 throughout the coextensive portions thereof.

In order to affect the rotary and longitudinal movement of the reel 50, indicated above, in response to the ignition of the ballistic charge 26, there is formed within the housing an expansible pressure chamber capable of receiving the high pressure gases generated by the ignition of the ballistic charge and imposing these high pressure gases on the reel 50 so as to effect the above-mentioned movement. To this end, the end of the reel member 50 adjacent the end closure 32 has an annular groove 82 formed in the exterior periphery thereof which receives an O-ring seal 84 adapted to engage the inner periphery of the tubular housing member 30 defining the chamber 48. In addition, a tubular sealing member 86 is mounted within the reel member 50 in fixed sealing engagement therewith, as by an annular flange 88 extending radially outwardly from the inner end thereof disposed in fixed engagement with an annular flange 90 extending inwardly from the interior periphery of the reel member 50 adjacent the end of the nut member 58. As shown, the flange 88 of the sealing member 86 is disposed in fluid-tight engagement with the reel member by an O-ring seal 92 and is fixed with respect to the flange 90 as by a split ring 94 engageable within a suitable groove formed in the inner periphery of the reel member 50.

The opposite end of the sealing member 86 has a flange 96 extending inwardly therefrom. The elongated rigid structure 60 includes a second portion extending from the end closure 32 having a cylindrical exterior periphery as indicated at 98 which is slidably engaged by the flange 96 and is sealed with respect thereto, as by an O-ring seal 100. It can thus be seen that a pressure chamber 102 is defined within the housing by the exterior periphery of the seal member 86, the interior periphery of the coextensive portion of the reel member 50, the interior surface of the end closure 32 and the portion of the interior periphery of the housing member 30 engaged by the O-ring seal 84 during the movement of the reel 22.

The ballistic charge 26 may be of any suitable construction. Preferably, it is of the type having an electrical type ignitor mounted in one end thereof in accordance with usual practice. It will be understood that the present invention is not limited to this particular type of ballistic charge but that other types may be utilized, for example, percussion ignited charges and the like.

*Operation*

When the ballistic actuated reel device 14 of the present invention is utilized in a cargo parachute combination such as illustrated in FIGURE 1, one end of the cable or flexible element 24 is fixed to the exterior periphery of the reel member 50 as indicated at 104 in FIGURE 5, the cable being disposed within the helical groove 52 and extending outwardly of the housing 16 through a centrally located opening 106 formed in the peripheral wall defined by the housing member 30. The opposite end of the cable 24 is connected to the lines of parachute 10 in any suitable manner. In addition, plates 18 are secured to the end closures 32 and the cables 20 fixed to the plates are mounted so that they will support the cargo 12. Finally, the ignition unit 28 is installed so that the lower end thereof extends below the cargo and will engage the ground to be actuated just prior to the engagement of the ground by the cargo 12.

It will be noted that the reel member 50 is initially disposed in the position shown in FIGURE 3 wherein the end thereof containing the seal 84 is in substantial engagement with the end closure 32. It will be noted that when the ignition unit 28 is actuated and the ballistic charge is ignited thereby, high pressure gases will be generated within the pressure chamber 102. These gases act between the radial surface defined by the end closure 32 and radial surfaces of the flanges 96 and 88 of the sealing member 86 and the radial end surface of the reel member 50 and will affect a rapid movement of the reel member 50 from the position shown in FIGURE 3 to a position wherein the flange 54 is disposed adjacent the end closure 34 as shown in FIGURE 4. During this movement, the balls 80 serve to impart a rotary movement to the reel member 50 which is in direct relation to the longitudinal movement as determined by the pitch of the grooves 76 and 78. This pitch is equal to the pitch of the helical groove 50 so that the portion of the periphery of the reel member receiving the portion of the cable 24 extending through the opening 106 will at all times be in alignment with the opening. Thus the cable will be wound around the exterior periphery of the reel member in a manner which will maintain the relative positions within the system through which the various forces are acting.

It will be understood that the speed of movement of the reel 50 in response to the ignition of the ballistic charge can be controlled by the proper selection of the charge itself. In the application shown in FIGURE 1, it would be desirable to affect a reeling in linear motion of the cable 24 which will offset the contemplated vertical linear movement of the cargo. In this way, the total component of downward movement of the cargo at the moment of impact with the ground is reduced to as nearly zero as possible thus reducing the chances that the cargo will be severely damaged by impact with the ground upon landing.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A ballistic actuated device for reeling in an elongated flexible element comprising an elongated housing having a pair of longitudinally spaced end closures in sealing engagement therewith, and a peripheral wall extending therebetween defining an elongated chamber therein between said end closures, said housing having an opening formed in the peripheral wall thereof communicating with said chamber for receiving the elongated flexible element therethrough, a reel mounted within said housing chamber for longitudinal and rotational movement about a longitudinal axis from a first operative position wherein one end of said reel is disposed adjacent one of said end closures to a second operative position wherein the other end of said reel is disposed adjacent the other of said end closures, said reel being arranged to fixedly receive one end of the flexible element and having an exterior periphery around which the flexible element is arranged to be wound in response to the longitudinal and rotational movement of said reel from said first position to said second position, an elongated rigid structure fixedly secured to said housing and extending longitudinally therethrough, said elongated rigid structure having a cylindrical exterior peripheral portion and a non-cylindrical exterior peripheral portion, said housing chamber including a cylindrical portion adjacent said one end closure, said reel including means sealingly engaging the cylindrical portion of said housing chamber and the cylindrical exterior peripheral portion of said elongated rigid structure to thereby form an expansible high pressure chamber defined by said one end closure, said cylindrical portion of said housing and said reel, means for receiving and supporting a ballistic charge of the type arranged to generate high pressure gases upon ignition in a position within said high pressure chamber to directly communicate the high pressure gases thus generated with said high pressure chamber, said reel being operable to move from said first operative position to said second operative position in response to the communication of high pressure gases with said pressure chamber, said reel having means fixed with respect thereto defining an interior peripheral portion surrounding the non-cylindrical exterior peripheral portion of said elongated rigid structure, and interengaging means between said non-cylindrical exterior peripheral portion and said interior peripheral portion for controlling the longitudinal and rotational movement of said reel from said first position to said second position.

2. A device as defined in claim 1 wherein said interengaging means comprises cooperating helical grooves formed in said non-cylindrical exterior peripheral portion and in said interior peripheral portion and a plurality of balls rollingly disposed within the coextensive portion of said grooves.

3. A device as defined in claim 2 wherein the exterior periphery of said reel has a flexible element receiving helical groove formed therein having a pitch equal to the pitch of said cooperating helical grooves.

4. A device as defined in claim 1 including a ballistic charge supported in said charge receiving and supporting means, said charge being disposed within said pressure chamber and extending within said reel when the latter is disposed in said first operative position.

5. A device as defined in claim 1 wherein the opposite ends of said elongated rigid structure are fixedly connected with said end closures.

6. A ballistic actuated device for reeling in an elongated flexible element comprising an elongated housing having a pair of longitudinally spaced end closures in sealing engagement therewith and a peripheral wall extending therebetween defining an elongated chamber therein between said end closures, said housing having an opening formed in the peripheral wall thereof communicating with said chamber for receiving the elongated flexible element therethrough, a tubular reel member mounted within said housing chamber for longitudinal and rotational movement about a longitudinal axis from a first operative position wherein one end of said reel member is disposed adjacent one of said end closures to a second operative position wherein the other end of said reel member is disposed adjacent the other of said end closures, said reel member being arranged to fixedly receive one end of the flexible element and having an exterior periphery around which the flexible element is arranged to be wound in response to the longitudinal and rotational movement of said reel member from said first position to said second position, an elongated rigid structure fixedly secured to said housing and extending longitudinally therethrough, said elongated rigid structure having a cylindrical exterior peripheral portion and a non-cylindrical exterior peripheral portion, said housing chamber including a cylindrical portion adjacent said one end closure, said reel member having annular sealing means in the exterior periphery thereof adjacent said one end thereof for slidably sealingly engaging the cylindrical portion of said housing chamber, a tubular sealing member mounted within said reel member in surrounding relation to said elongated rigid structure, the end of said sealing member adjacent said one end closure slidably sealingly engaging the cylindrical exterior peripheral portion of said elongated rigid structure, the opposite end of said sealing member being sealingly connected with said reel member, said sealing member and said one end closure defining an expansible pressure chamber between the cylindrical portions of said housing chamber and said elongated rigid structure extending therebetween, means for receiving and supporting a ballistic charge of the type arranged to generate high pressure gases upon ignition in a position within said high pressure chamber, said reel member being operable to move from said first operative position to said second operative position in response to the ignition of a charge within said pressure chamber, said reel member having means fixed with respect thereto and disposed adjacent said opposite end thereof defining an interior peripheral portion surrounding the non-cylindrical exterior peripheral portion of said elongated rigid structure, and interengaging means between said non-cylindrical exterior peripheral portion and said interior peripheral portion for controlling the longitudinal and rotational movement of said reel member from said first position to said second position.

7. A device as defined in claim 6 wherein said interengaging means comprises cooperating helical grooves formed in said non-cylindrical exterior peripheral portion and in said interior peripheral portion and a plurality of balls rollingly disposed within the coextensive portion of said grooves.

8. A device as defined in claim 7 wherein the exterior periphery of said reel has a flexible element receiving helical groove formed therein having a pitch equal to the pitch of said cooperating helical grooves.

9. A device as defined in claim 6 wherein the opposite ends of said elongated rigid structure are fixedly connected with said end closures.

10. In apparatus including a cargo unit to be dropped from an airborne vehicle, a parachute unit for supporting the cargo in the air, a ballistic actuated device operatively connected by means of at least one elongated flexible element between said units for effecting a vertical movement of the two toward each other in response to ignition of said ballistic actuated device, and means operable in response to the vertically downward movement of said cargo unit into a position adjacent the ground for effecting ignition of said ballistic actuated device, the improvement which comprises said ballistic actuated device including an elongated housing having a pair of longitudinally spaced end closures in sealing engagement therewith, and a peripheral wall extending therebetween defining an elongated chamber therein between said end closures, said housing having an opening formed in the peripheral wall thereof communicating with said chamber for receiving the elongated flexible element therethrough, a reel mounted within said housing chamber for longitudinal and rotational movement about a longitudinal axis from a first operative position wherein one end of said reel is disposed adjacent one of said end closures to a second operative position wherein the other end of said reel is disposed adjacent the other of said end closures, said reel being arranged to fixedly receive one end of the flexible element and having an exterior periphery around which the flexible element is arranged to be wound in response to the longitudinal and rotational movement of said reel from said first position to said second position, an elongated rigid structure fixedly secured to said housing and extending longitudinally therethrough, said elongated rigid structure having a cylindrical exterior peripheral portion and a non-cylindrical exterior peripheral portion, said housing chamber including a cylindrical portion adjacent said one end closure, said reel including means sealingly engaging the cylindrical portion of said housing chamber and the cylindrical exterior peripheral portion of said elongated rigid structure to thereby form an expansible high pressure chamber defined by said one end closure, said cylindrical portion of said housing and said reel, means for receiving and supporting a ballistic charge of the type arranged to generate high pressure gases upon ignition in a position within said high pressure chamber and extending within said reel when the latter is disposed in said first operative position so as to directly communicate the high pressure gases thus generated with said high pressure chamber, a ballistic charge operatively received and supported by said last mentioned means and connected with said ignition effecting means to be ignited thereby, said reel being operable to move from said first operative position to said second operative position in response to the communication of high pressure gases with said pressure chamber, said reel having means fixed with respect thereto defining an interior peripheral portion surrounding the non-cylindrical exterior peripheral portion of said elongated rigid structure, and interengaging helical groove and ball means between said non-cylindrical exterior peripheral portion and said interior peripheral portion for controlling the longitudinal and rotational movement of said reel from said first position to said second position.

References Cited in the file of this patent
UNITED STATES PATENTS

| | | |
|---|---|---|
| 1,118,270 | Dahl | Nov. 24, 1914 |
| 2,477,907 | Smith | Aug. 2, 1949 |
| 2,478,494 | Martin | Aug. 9, 1949 |
| 2,598,306 | Rostine | May 27, 1952 |
| 3,003,748 | Musser | Oct. 10, 1961 |

FOREIGN PATENTS

| | | |
|---|---|---|
| 540,724 | Great Britain | Oct. 28, 1941 |
| 1,231,466 | France | Apr. 11, 1960 |